(12) United States Patent
Nakajima et al.

(10) Patent No.: US 10,473,296 B2
(45) Date of Patent: Nov. 12, 2019

(54) DISPLAY DEVICE CAPABLE OF DISPLAYING GRADATION PATTERN, GLASS FOR AUTOMOBILE ROOF, AND WINDOW GLASS FOR BUILDING

(71) Applicant: SEKISUI CHEMICAL CO., LTD., Osaka (JP)

(72) Inventors: Daisuke Nakajima, Shiga (JP); Yuusuke Oota, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/067,664

(22) PCT Filed: Feb. 28, 2017

(86) PCT No.: PCT/JP2017/007896
§ 371 (c)(1),
(2) Date: Jul. 2, 2018

(87) PCT Pub. No.: WO2017/150555
PCT Pub. Date: Sep. 8, 2017

(65) Prior Publication Data
US 2019/0011113 A1  Jan. 10, 2019

(30) Foreign Application Priority Data
Feb. 29, 2016 (JP) ................. 2016-037477

(51) Int. Cl.
*F21V 9/32* (2018.01)
*B60Q 3/208* (2017.01)
(Continued)

(52) U.S. Cl.
CPC ............... *F21V 9/32* (2018.02); *B60Q 3/208* (2017.02); *E06B 3/67* (2013.01); *E06B 7/28* (2013.01)

(58) Field of Classification Search
None
See application file for complete search history.

(56) References Cited

U.S. PATENT DOCUMENTS

2014/0355106 A1* 12/2014 Laluet ................ B60J 1/02
359/359
2015/0002929 A1* 1/2015 Sablayrolles .......... C08K 5/005
359/361
(Continued)

FOREIGN PATENT DOCUMENTS

EP 2219056 8/2010
JP 2006-298061 11/2006
(Continued)

OTHER PUBLICATIONS

International Search Report dated May 23, 2017 in International Application No. PCT/JP2017/007896.

*Primary Examiner* — Elmito Breval
(74) *Attorney, Agent, or Firm* — Wenderoth, Lind & Ponack, L.L.P.

(57) ABSTRACT

The present invention aims to provide a display device capable of displaying a gradation pattern in which the gradation pattern on a laminated glass can be changed at will and a display state can be switched to a transparent state, and an automobile roof glass and a building window glass each including the display device. Provided is a display device capable of displaying a gradation pattern, including: a laminated glass including a pair of glass plates and an interlayer film for a laminated glass that contains a thermoplastic resin and a luminescent material and is interposed between the pair of glass plates; and a light source configured to emit light of excitation wavelength for the luminescent material, the laminated glass and the light source being disposed such (Continued)

that the laminated glass is irradiated from its periphery toward the inside with the light emitted from the light source.

7 Claims, 2 Drawing Sheets

(51) Int. Cl.
    *E06B 3/67*     (2006.01)
    *E06B 7/28*     (2006.01)

(56)     References Cited

U.S. PATENT DOCUMENTS

| | | |
|---|---|---|
| 2015/0308659 A1 | 10/2015 | Clabau et al. |
| 2016/0288460 A1 | 10/2016 | Nakayama et al. |
| 2017/0197386 A1 | 7/2017 | Oota et al. |

FOREIGN PATENT DOCUMENTS

| | | |
|---|---|---|
| JP | 2014-024312 | 2/2014 |
| JP | 2015-513684 | 5/2015 |
| WO | 2014/077328 | 5/2014 |
| WO | 2014/102482 | 7/2014 |
| WO | 2016/017825 | 2/2016 |

\* cited by examiner (a)

(b)

DISPLAY DEVICE CAPABLE OF DISPLAYING GRADATION PATTERN, GLASS FOR AUTOMOBILE ROOF, AND WINDOW GLASS FOR BUILDING

TECHNICAL FIELD

The present invention relates to a display device capable of displaying a gradation pattern in which the gradation pattern displayed on a laminated glass can be changed at will and a display state can be switched to a transparent state, and an automobile roof glass and a building window glass each including the display device.

BACKGROUND ART

Laminated glass is less likely to scatter even when shattered by external impact and can be safely used. Due to this advantage, laminated glass has been widely used, for example, in front, side, and rear windshields of vehicles including automobiles and windowpanes of aircraft, buildings, or the like. A known example of laminated glass is a type of laminated glass including at least a pair of glass plates integrated through, for example, an interlayer film for a laminated glass which contains a liquid plasticizer and a polyvinyl acetal resin.

Recently, the performance required of glass has been increasingly diversified. From the aspects of the design, privacy protection, and light shielding effect, a glass with a gradation pattern in which the color is smoothly changed from dark to light has been desired.

For example, in the case where the glass with a gradation pattern is used as a building window glass, the window can have an excellent design and can become opaque at a desired part to provide privacy protection. For another example, in the case where the glass with a gradation pattern is used as an automobile roof glass, the automobile roof can have an excellent design and can block light from the outside to control the light in the automobile.

As such a glass with a gradation pattern, Patent Literature 1 discloses an interlayer film for a laminated glass including a dark color section, a gradation section, and a transparent section, in which these sections are situated along side each other in the stated order in the direction orthogonal to the thickness direction.

However, for achieving highly excellent design, privacy protection, and light shielding effect, a single gradation pattern is not enough and the gradation pattern is desired to be changed with the situation. Moreover, according to the situation, the gradation pattern is desired to be turned off to set the glass in a transparent state. In any conventional glass with a gradation pattern, however, it has been difficult to change the gradation pattern at will or switch the display state to a transparent state.

CITATION LIST

Patent Literature

Patent Literature 1: WO 2014/077328

SUMMARY OF INVENTION

Technical Problem

The present invention aims to, in consideration of the state of the art, provide a display device capable of displaying a gradation pattern in which the gradation pattern displayed on a laminated glass can be changed at will and a display state can be switched to a transparent state and an automobile roof glass and a building window glass each including the display device.

Solution to Problem

The present invention relates to a display device capable of displaying a gradation pattern, including: a laminated glass including a pair of glass plates and an interlayer film for a laminated glass that contains a thermoplastic resin and a luminescent material and is interposed between the pair of glass plates; and a light source configured to emit light of excitation wavelength for the luminescent material, the laminated glass and the light source being disposed such that the laminated glass is irradiated from its periphery toward the inside with the light emitted from the light source.

The present invention will be specifically described in the following.

The present inventors made an intensive study to find out that the gradation pattern displayed on a laminated glass can be changed at will and a display state can be switched to a transparent state when the following two conditions are satisfied: a laminated glass including a pair of glass plates and an interlayer film for a laminated glass that contains a thermoplastic resin and a luminescent material and is interposed between the pair of glass plates is used in combination with a light source configured to emit light of excitation wavelength for the luminescent material; the laminated glass and the light source are disposed such that the laminated glass is irradiated from its periphery toward the inside with the light emitted from the light source. Thus, the present invention was completed.

The display device capable of displaying a gradation pattern (hereafter, also simply referred to as a "display device") of the present invention includes a laminated glass and a light source capable of irradiating the laminated glass with light of excitation wavelength for the luminescent material.

The laminated glass includes a pair of glass plates and an interlayer film for a laminated glass that contains a thermoplastic resin and a luminescent material and is interposed between the pair of glass plates.

Any thermoplastic resin may be used, and examples thereof include polyvinyl acetal resins, ethylene-vinyl acetate copolymer resins, ethylene-acryl copolymer resins, polyurethane resins, polyurethane resins containing sulfur element, polyvinyl alcohol resins, vinyl chloride resins, and polyethylene terephthalate resins. Suitable among these are polyvinyl acetal resins because when a polyvinyl acetal resin is used with a plasticizer, the resulting interlayer film for a laminated glass has excellent adhesion to glass.

The polyvinyl acetal is not particularly limited as long as it is obtained by acetalization of polyvinyl alcohol with an aldehyde, and is preferably polyvinyl butyral. Two or more kinds of polyvinyl acetals may be used in combination.

The lower limit of the degree of acetalization of the polyvinyl acetal is preferably 40 mol % and the upper limit thereof is preferably 85 mol %. The lower limit is more preferably 60 mol % and the upper limit is more preferably 75 mol %.

The lower limit of the hydroxy group content of the polyvinyl acetal is preferably 15 mol % and the upper limit thereof is preferably 35 mol %. When the hydroxy group content is 15 mol % or more, formation of the interlayer film for a laminated glass is facilitated. When the hydroxy group content is 35 mol % or less, the interlayer film for a laminated glass to be obtained is easy to handle.

The degree of acetalization and the hydroxy group content can be measured in accordance with, for example, "Testing methods for polyvinyl butyral" in JIS K 6728.

The polyvinyl acetal can be prepared by acetalization of polyvinyl alcohol with an aldehyde. The polyvinyl alcohol is normally prepared by saponifying polyvinyl acetate. Polyvinyl alcohol commonly used has a degree of saponification of 70 to 99.8 mol %.

The lower limit of the degree of polymerization of the polyvinyl alcohol is preferably 500 and the upper limit thereof is preferably 4,000. When the polyvinyl alcohol has a degree of polymerization of 500 or more, the laminated glass to be obtained has higher penetration resistance. When the polyvinyl alcohol has a degree of polymerization of 4,000 or less, formation of the interlayer film for a laminated glass is facilitated. The lower limit of the degree of polymerization of the polyvinyl alcohol is more preferably 1,000 and the upper limit thereof is more preferably 3,600.

The aldehyde is not particularly limited. Commonly, preferred is a C1-C10 aldehyde. The C1-C10 aldehyde is not particularly limited, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The luminescent material may be any conventionally known luminescent material.

The luminescent material is preferably in the form of particles. The luminescent material in the form of particles can be readily dispersed in the interlayer film for a laminated glass.

The lower limit of the amount of the luminescent material in the interlayer film for a laminated glass is preferably 0.001 parts by weight and the upper limit thereof is preferably 15 parts by weight, relative to 100 parts by weight of the thermoplastic resin. When the amount of the luminescent material is 0.001 parts by weight or more, a gradation pattern of further excellent design can be displayed. When the amount of the luminescent material is 15 parts by weight or less, the transparency of the interlayer film for a laminated glass after the gradation pattern is turned off is further improved. The lower limit of the amount of the luminescent material is more preferably 0.01 parts by weight and the upper limit thereof is more preferably 10 parts by weight. The lower limit is still more preferably 0.05 parts by weight and the upper limit is still more preferably 8 parts by weight. The lower limit is particularly preferably 0.1 parts by weight and the upper limit is particularly preferably 5 parts by weight. The upper limit is most preferably 1 part by weight.

Specific examples of the luminescent material include a lanthanoid complex with a ligand containing a halogen atom because high luminescent properties can be exhibited.

Among lanthanoid complexes, the lanthanoid complex with a ligand containing a halogen atom becomes luminous at a high intensity under irradiation with light. Examples of the lanthanoid complex with a ligand containing a halogen atom include lanthanoid complexes with a monodentate ligand containing a halogen atom and lanthanoid complexes with a multidentate ligand containing a halogen atom (e.g., lanthanoid complexes with a bidentate ligand containing a halogen atom, lanthanoid complexes with a tridentate ligand containing a halogen atom, lanthanoid complexes with a tetradentate ligand containing a halogen atom, lanthanoid complexes with a pentadentate ligand containing a halogen atom, lanthanoid complexes with a hexadentate ligand containing a halogen atom).

In particular, a lanthanoid complex with a bidentate ligand containing a halogen atom or a lanthanoid complex with a tridentate ligand containing a halogen atom becomes luminous at a wavelength of 580 to 780 nm at a significantly high intensity under irradiation with light at a wavelength of 300 to 410 nm. Owing to such high-intensity luminescence, the interlayer film for a laminated glass including a luminescent layer containing the lanthanoid can become luminous at a relatively high luminance even under irradiation with low-intensity light. The use of the interlayer film for a laminated glass enables display of a gradation pattern with a relatively simple light source, which allows simplification of the display device.

In addition, the lanthanoid complex with a bidentate ligand containing a halogen atom or lanthanoid complex with a tridentate ligand containing a halogen atom is also excellent in heat resistance. The automobile roof glass or building window glass is often used in a high temperature environment because it is irradiated with infrared rays in the sunlight. In such a high temperature environment, the luminescent material may be deteriorated especially at an end portion of the laminated glass, possibly impairing the design of the gradation pattern. The use of the lanthanoid complex with a bidentate ligand containing a halogen atom or a lanthanoid complex with a tridentate ligand containing a halogen atom as a luminescent material enables production of an interlayer film for a laminated glass which is less likely to suffer impairment of the design even in a high temperature environment.

As used herein, examples of the lanthanoid include lanthanum, cerium, praseodymium, neodymium, promethium, samarium, europium, gadolinium, terbium, dysprosium, holmium, erbium, thulium, ytterbium, and lutetium. For higher emission intensity, the lanthanoid is preferably neodymium, europium, or terbium, more preferably europium or terbium, still more preferably europium.

Examples of the bidentate ligand containing a halogen atom include ligands having a structure represented by the following formula (1) and ligands having a structure represented by the following formula (2).

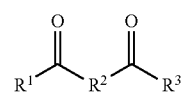

(1)

In the formula (1), $R^1$ and $R^3$ each are an organic group and at least one of $R^1$ and $R^3$ represents an organic group containing a halogen atom, and $R^2$ is a linear organic group having a carbon number of 1 or more. $R^1$ and $R^3$ each are preferably a hydrocarbon group, more preferably a C1-C10 hydrocarbon group, still more preferably a C1-C5 hydrocarbon group, particularly preferably a C1-C3 hydrocarbon group. The hydrogen atoms in the hydrocarbon group may be partly substituted with an atom other than hydrogen atom or a functional group. Examples of the C1-C3 hydrocarbon group include methyl, ethyl, and propyl groups in which no hydrogen atom is substituted and methyl, ethyl, and propyl groups in which hydrogen atoms are partly substituted with a halogen atom. The halogen atom substituting a part of the hydrogen atoms in the methyl, ethyl, and propyl groups may be fluorine atom, chlorine atom, bromine atom, or iodine atom. The C1-C3 hydrocarbon group is preferably a methyl, ethyl, or propyl group in which hydrogen atoms are partly substituted with a halogen atom, with a trifluoromethyl group being more preferred, because luminescence at a high intensity can be achieved.

$R^2$ is preferably an alkylene group having one or more carbon atoms, more preferably a C1-C5 alkylene group, and most preferably a C1 methylene group. The hydrogen atoms in the alkylene group having one or more carbon atoms may be partly substituted with an atom other than hydrogen atom and a functional group.

The lanthanoid complex with a ligand containing a halogen atom is only required to have at least one ligand containing a halogen atom and may additionally have a ligand not containing a halogen atom. Examples of the ligand not containing a halogen atom include ligands having the same structure as that of the formula (1) except for not including a halogen atom and ligands having a structure represented by any of the following formulae (2) to (8). The hydrogen atoms in the ligand having a structure represented by any of the formulae (2) to (8) may be partly or entirely substituted with —COOR, —SO$_3$, —NO$_2$, —OH, an alkyl group, or —NH$_2$.

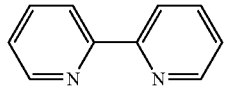
(2)

In the formula (2), two Ns may be present at any positions in the bipyridine skeleton. For example, two Ns may be present at 2- and 2'-positions, 3- and 3'-positions, 4- and 4'-positions, 2- and 3'-positions, 2- and 4'-positions, or 3- and 4'-positions. In particular, two Ns are preferably present at 2- and 2'-positions.

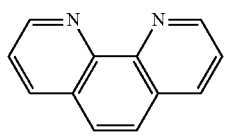
(3)

In the formula (3), two Ns may be present at any positions in the bipyridine skeleton. In particular, two Ns are preferably present at 1- and 10-positions.

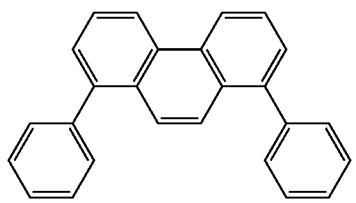
(4)

In the formula (4), two Ns may be present at any positions in the bipyridine skeleton. In particular, two Ns are preferably present at 1- and 10-positions.

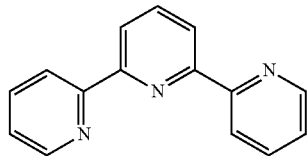 [SMILES: c1ccc(-c2cccc(-c3ccccn3)n2)nc1]

In the formula (5), three Ns may be present at any positions in the terpyridine skeleton.

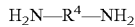
(6)

In the formula (6), $R^4$ at the center represents a linear organic group having one or more carbon atoms.

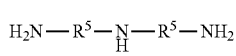
(7)

In the formula (7), two $R^5$s each represent a linear organic group having one or more carbon atoms.

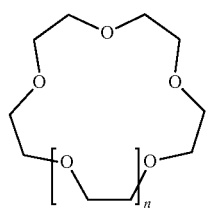
(8)

In the formula (8), n represents an integer of 1 or 2.

Examples of the lanthanoid complexes with a bidentate ligand containing a halogen atom include tris(trifluoroacetylacetone)phenanthroline europium (Eu(TFA)$_3$phen), tris(trifluoroacetylacetone)diphenyl phenanthroline europium (Eu(TFA)$_3$dpphen), tris(hexafluoroacetylacetone)diphenyl phenanthroline europium, tris(hexafluoroacetylacetone)bis(triphenylphosphine) europium, tris(trifluoroacetylacetone)2,2'-bipyridine europium, tris(hexafluoroacetylacetone)2,2'-bipyridine europium, tris(5,5,6,6,7,7,7-heptafluoro-2,4-pentanedionate)2,2'-bipyridine europium ([Eu(FPD)$_3$]bpy), tris(trifluoroacetylacetone)3,4,7,8-tetramethyl-1,10 phenanthroline europium ([Eu(TFA)$_3$]tmphen), tris(5,5,6,6,7,7,7-heptafluoro-2,4-pentanedionate)phenanthroline europium ([Eu(FPD)$_3$]phen), terpyridine trifluoroacetylacetone europium, and terpyridine hexafluoroacetylacetone europium.

Other examples of the lanthanoid complexes with a bidentate ligand containing a halogen atom include tris(trifluoroacetylacetone)phenanthroline terbium (Tb(TFA)$_3$phen), tris(trifluoroacetylacetone)diphenyl phenanthroline terbium (Tb(TFA)$_3$dpphen), tris(hexafluoroacetylacetone)diphenyl phenanthroline terbium, tris(hexafluoroacetylacetone)bis(triphenylphosphine)terbium, tris(trifluoroacetylacetone)2,2'-bipyridine terbium, tris(hexafluoroacetylacetone)2,2'-bipyridine terbium, tris(5,5,6,6,7,7,7-heptafluoro-2,4-pentanedionate)2,2'-bipyridine terbium ([Tb(FPD)$_3$]bpy), tris(trifluoroacetylacetone)3,4,7,8-tetramethyl-1,10 phenanthroline terbium ([Tb(TFA)$_3$]tmphen), tris(5,5,6,6,7,7,7-heptafluoro-2,4-pentanedionate)phenanthroline terbium ([Tb(FPD)$_3$]phen), terpyridine trifluoroacetylacetone terbium, and terpyridine hexafluoroacetylacetone terbium.

Examples of the halogen atom in the lanthanoid complex with a ligand containing a halogen atom include a fluorine atom, a chlorine atom, a bromine atom, and an iodine atom. Preferred is a fluorine atom for better stability of the ligand structure.

Among the lanthanoid complexes with a bidentate ligand containing a halogen atom or the lanthanoid complexes with a tridentate ligand containing a halogen atom, a lanthanoid complex with a bidentate ligand containing a halogen atom and having an acetylacetone skeleton is preferred because of its excellent initial luminescent properties.

Examples of the lanthanoid complex with a bidentate ligand containing a halogen atom and having an acetylacetone skeleton include Eu(TFA)$_3$phen, Eu(TFA)$_3$dpphen, Eu(HFA)$_3$phen, [Eu(FPD)$_3$]bpy, [Eu(TFA)$_3$]tmphen, and [Eu(FPD)$_3$]phen. The structures of these lanthanoid complexes with a bidentate ligand containing a halogen atom and having an acetylacetone skeleton are shown below.

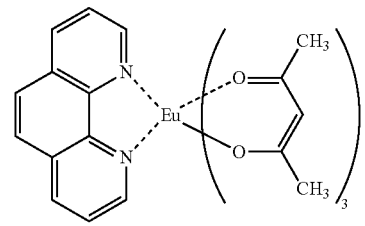

Eu(TFA)$_3$phen

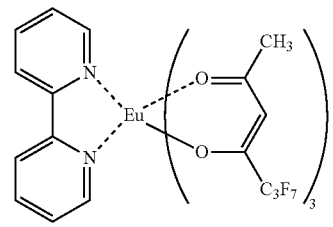

[Eu(FPD)$_3$]bpy

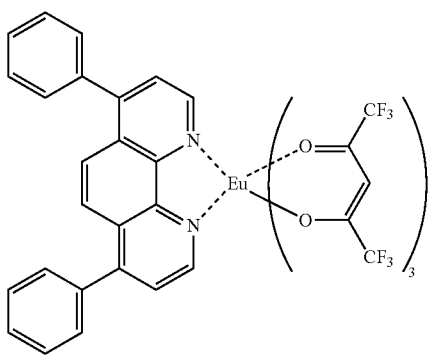

Eu(TFA)$_3$dpphen

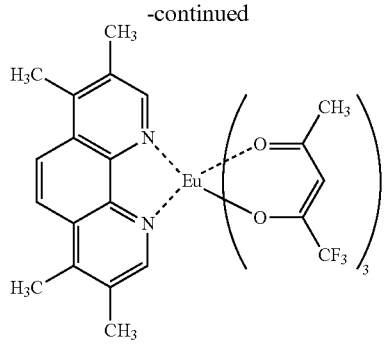

[Eu(TFA)$_3$]tmphen

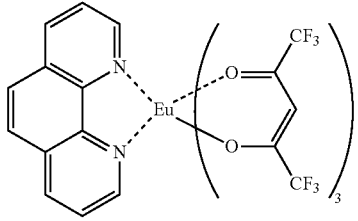

Eu(HFA)$_3$phen

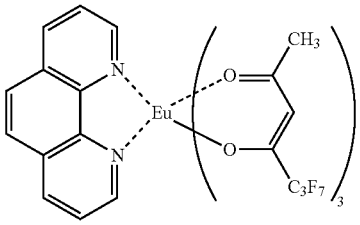

[Eu(FPD)$_3$]phen

Other examples of the lanthanoid complex with a bidentate ligand containing a halogen atom and having an acetylacetone skeleton include Tb(TFA)$_3$phen, Tb(TFA)$_3$dpphen, Tb(HFA)$_3$phen, [Tb(FPD)$_3$]bpy, [Tb(TFA)$_3$]tmphen, and [Tb(FPD)$_3$]phen.

The lanthanoid complex with a ligand containing a halogen atom is preferably in the form of particles. The lanthanoid complex with a ligand containing a halogen atom in the form of particles can be readily dispersed in the interlayer film for a laminated glass.

In the case where the lanthanoid complex with a ligand containing a halogen atom is in the form of particles, the lower limit of the average particle size of the lanthanoid complex is preferably 0.01 μm and the upper limit thereof is preferably 10 μm. The lower limit is more preferably 0.03 μm and the upper limit is more preferably 1 μm.

The lower limit of the amount of the lanthanoid complex with a ligand containing a halogen atom in the interlayer film for a laminated glass is preferably 0.001 parts by weight and the upper limit thereof is preferably 10 parts by weight, relative to 100 parts by weight of the thermoplastic resin. When the amount of the lanthanoid complex with a ligand containing a halogen atom is 0.001 parts by weight or more, a gradation pattern of further excellent design can be displayed. When the amount of the lanthanoid complex with a ligand containing a halogen atom is 10 parts by weight or less, the transparency of the interlayer film for a laminated glass after the gradation pattern is turned off is further improved. The lower limit of the amount of the lanthanoid complex with a ligand containing a halogen atom is more preferably 0.01 parts by weight and the upper limit thereof is more preferably 5 parts by weight. The lower limit is still more preferably 0.05 parts by weight and the upper limit is still more preferably 1 part by weight.

The luminescent material used may be a luminescent material having a terephthalic acid ester structure. The luminescent material having a terephthalic acid ester structure becomes luminous under irradiation with light.

Examples of the luminescent material having a terephthalic acid ester structure include compounds having a structure represented by the formula (9) and compounds having a structure represented by the formula (10).

Each of these may be used alone or in combination of two or more thereof.

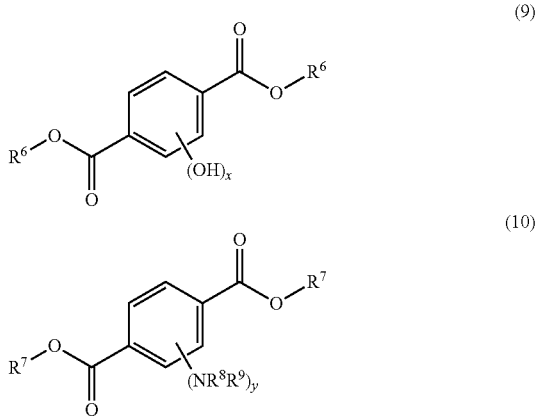

In the formula (9), $R^6$ is an organic group and x is 1, 2, 3, or 4.

For higher transparency of the interlayer film for a laminated glass, x is preferably 1 or 2, and the luminescent material has a hydroxy group more preferably at 2 or 5 position of the benzene ring, still more preferably at 2 and 5 positions of the benzene ring.

The organic group of $R^6$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has a carbon number of 10 or smaller, the luminescent material having a terephthalic acid ester structure can be easily dispersed in the interlayer film for a laminated glass.

The hydrocarbon group is preferably an alkyl group.

Examples of the compound having a structure represented by the formula (9) include diethyl-2,5-dihydroxyterephthalate and dimethyl 2,5-dihydroxyterephthalate.

In particular, for display of a gradation pattern of further excellent design, the compound having a structure represented by the formula (9) is preferably diethyl-2,5-dihydroxylterephthalate ("diethyl 2,5-dihydroxyterephthalate" available from Sigma-Aldrich).

In the formula (10), $R^7$ is an organic group, $R^8$ and $R^9$ each are a hydrogen atom or an organic group, and y is 1, 2, 3, or 4.

The organic group of $R^7$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has a carbon number satisfying the upper limit, the luminescent material having a terephthalic acid ester structure can be easily dispersed in the interlayer film for a laminated glass.

The hydrocarbon group is preferably an alkyl group.

In the formula (10), $NR^8R^9$ is an amino group. $R^8$ and $R^9$ each are preferably a hydrogen atom.

The benzene ring in the compound having a structure represented by the formula (10) may have the amino group(s) at the position(s) of one hydrogen atom, two hydrogen atoms, three hydrogen atoms, or four hydrogen atoms among hydrogen atoms of the benzene ring.

For display of a gradation pattern of further excellent design, the compound having a structure represented by the formula (10) is preferably diethyl-2,5-diaminoterephthalate (Sigma-Aldrich).

The amount of the luminescent material having a terephthalic acid ester structure in the interlayer film for a laminated glass is not particularly limited, and the lower limit thereof is preferably 0.001 parts by weight and the upper limit is preferably 15 parts by weight, relative to 100 parts by weight of the thermoplastic resin.

When the amount of the luminescent material having a terephthalic acid ester structure is 0.001 parts by weight or more, a gradation pattern of further excellent design can be displayed by irradiation with light. When the amount of the luminescent material having a terephthalic acid ester structure is 15 parts by weight or less, the transparency of the interlayer film for a laminated glass after the gradation pattern is turned off is further improved. The lower limit of the amount of the luminescent material having a terephthalic acid ester structure is more preferably 0.01 parts by weight and the upper limit thereof is more preferably 10 parts by weight. The lower limit is still more preferably 0.1 parts by weight and the upper limit is still more preferably 8 parts by weight. The lower limit is particularly preferably 0.5 parts by weight and the upper limit is particularly preferably 5 parts by weight.

The lower limit of the amount of the luminescent material having a terephthalic acid ester structure in the interlayer film for a laminated glass is preferably 0.007% by weight and the upper limit thereof is preferably 4.5% by weight in 100% by weight of the interlayer film for a laminated glass.

When the amount of the luminescent material having a terephthalic acid ester structure is 0.007% by weight or more, a gradation pattern of further excellent design can be displayed. When the amount of the luminescent material having a terephthalic acid ester structure is 4.5% by weight or less, the transparency of the interlayer film for a laminated glass after the gradation pattern is turned off is further improved.

The lower limit of the amount of the luminescent material having a terephthalate ester structure is more preferably 0.01% by weight and the upper limit thereof is more preferably 4% by weight. The lower limit is still more preferably 0.1% by weight and the upper limit is still more preferably 3.5% by weight.

The interlayer film for a laminated glass may contain potassium, sodium, and magnesium derived from raw materials of a neutralizer or the like used in the production of the thermoplastic resin. The total amount of potassium, sodium, and magnesium in the interlayer film for a laminated glass is preferably 50 ppm or less.

With the total amount of potassium, sodium, and magnesium of 50 ppm or less, a decrease in the luminescent properties of the luminescent material used together can be prevented.

The amount of magnesium in the interlayer film for a laminated glass is preferably 40 ppm or less. When the amount of magnesium contained in the interlayer film for a laminated glass is 40 ppm or less, a decrease in the luminescent properties of the luminescent material in the interlayer film for a laminated glass can be more reliably suppressed. The amount of magnesium contained in the interlayer film for a laminated glass is more preferably 35 ppm or less, still more preferably 30 ppm or less, particularly preferably 20 ppm or less. The amount of magnesium contained in the interlayer film for a laminated glass may be 0 ppm.

The total amount of potassium, sodium, and magnesium in the interlayer film for a laminated glass is adjusted to 50 ppm or less preferably by washing the thermoplastic resin with an excessive amount of ion exchange water multiple times.

The interlayer film for a laminated glass preferably further contains a dispersant. The use of a dispersant can inhibit aggregation of the luminescent material, leading to further uniform luminescence.

The dispersant used may be, for example, a compound having a sulfonic acid structure such as linear alkyl benzene sulfonates; a compound having an ester structure such as diester compounds, ricinoleic acid alkyl esters, phthalic acid esters, adipic acid esters, sebacic acid esters, and phosphoric acid esters; a compound having an ether structure such as polyoxyethylene glycols, polyoxypropylene glycols, and alkyl phenyl-polyoxyethylene-ethers; a compound having a carboxylic acid structure such as polycarboxylic acids; a compound having an amine structure such as laurylamine, dimethyllaurylamine, oleyl propylenediamine, polyoxyethylene secondary amine, polyoxyethylene tertiary amine, and polyoxyethylene diamine; a compound having a polyamine structure such as polyalkylene polyamine alkylene oxide; a compound having an amide structure such as oleic acid diethanolamide and alkanol fatty acid amide; and a compound having a high-molecular-weight amide structure such as polyvinylpyrrolidone and polyester acid amidoamine salt. Also, the dispersant used may be a high-molecular-weight dispersant such as polyoxyethylene alkyl ether phosphoric acid (salt), high-molecular-weight polycarboxylic acids, and condensed ricinoleic acid esters. The high-molecular-weight dispersant is defined as a dispersant having a molecular weight of 10,000 or higher.

In the case where the dispersant is used, the lower limit of the amount of the dispersant relative to the luminescent material in the interlayer film for a laminated glass is preferably 1 part by weight and the upper limit thereof is preferably 50 parts by weight. When the amount of the dispersant is within the above range, the luminescent material can be uniformly dispersed in the interlayer film for a laminated glass. The lower limit of the amount of the dispersant is more preferably 3 parts by weight and the upper limit thereof is more preferably 30 parts by weight. The lower limit is still more preferably 5 parts by weight and the upper limit is still more preferably 25 parts by weight.

The interlayer film for a laminated glass may further contain an ultraviolet absorber. The interlayer film for a laminated glass containing an ultraviolet absorber can have higher light resistance.

For obtaining a display device capable of displaying a gradation pattern of further excellent design, the upper limit of the amount of the ultraviolet absorber in the interlayer film for a laminated glass is preferably 1 part by weight, more preferably 0.5 parts by weight, still more preferably 0.2 parts by weight, particularly preferably 0.1 parts by weight, relative to 100 parts by weight of the thermoplastic resin.

Examples of the ultraviolet absorber include compounds having a malonic acid ester structure, compounds having an oxanilide structure, compounds having a benzotriazole structure, compounds having a benzophenone structure, compounds having a triazine structure, and compounds having a hindered amine structure.

The interlayer film for a laminated glass may further contain a plasticizer.

Any plasticizer may be used, and examples thereof include organic ester plasticizers such as monobasic organic acid esters and polybasic organic acid esters, and phosphoric acid plasticizers such as organophosphate plasticizers and organophosphite plasticizers. The plasticizer is preferably a liquid plasticizer.

The monobasic organic acid esters are not particularly limited, and examples thereof include glycol esters obtained by a reaction between glycol (e.g., triethylene glycol, tetraethylene glycol, tripropylene glycol) and a monobasic organic acid (e.g., butyric acid, isobutyric acid, caproic acid, 2-ethylbutyric acid, heptanoic acid, n-octylic acid, 2-ethylhexylic acid, pelargonic acid (n-nonylic acid), decylic acid). In particular, preferred are triethylene glycol dicaproic acid ester, triethylene glycol di-2-ethylbutyric acid ester, triethylene glycol di-n-octylic acid ester, and triethylene glycol di-2-ethylhexylic acid ester.

The polybasic organic acid esters are not particularly limited, and examples thereof include ester compounds of a polybasic organic acid (e.g., adipic acid, sebacic acid, azelaic acid) with a C4-C8 linear or branched alcohol. In particular, preferred are dibutyl sebacic acid ester, dioctyl azelaic acid ester, and dibutyl carbitol adipic acid ester.

The organic ester plasticizers are not particularly limited, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptylnonyl adipate, dibutyl sebacate, oil-modified alkyd sebacate, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

The organophosphate plasticizers are not particularly limited, and examples thereof include tributoxyethyl phosphate, isodecylphenyl phosphate, and triisopropyl phosphate.

Among these, the plasticizer is preferably at least one selected from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), and triethylene glycol di-n-heptanoate (3G7).

For less hydrolysis, the plasticizer preferably contains triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO)

or triethylene glycol di-2-ethylhexanoate (3GO), particularly preferably triethylene glycol di-2-ethylhexanoate (3GO).

The amount of the plasticizer in the interlayer film for a laminated glass is not particularly limited. The lower limit thereof is preferably 30 parts by weight and the upper limit thereof is preferably 100 parts by weight relative to 100 parts by weight of the thermoplastic resin. When the amount of the plasticizer is 30 parts by weight or more, the interlayer film for a laminated glass has a lower melt viscosity, facilitating molding of the interlayer film for a laminated glass. When the amount of the plasticizer is 100 parts by weight or less, the transparency of the interlayer film for a laminated glass after the gradation pattern is turned off is further improved. The lower limit of the amount of the plasticizer is more preferably 35 parts by weight and the upper limit thereof is more preferably 80 parts by weight. The lower limit is still more preferably 45 parts by weight and the upper limit is still more preferably 70 parts by weight. The lower limit is particularly preferably 50 parts by weight and the upper limit is particularly preferably 63 parts by weight.

For achieving excellent light resistance, the interlayer film for a laminated glass preferably contains an antioxidant.

The antioxidant may be any antioxidant, and examples thereof include antioxidants having a phenol structure, antioxidants containing sulfur, and antioxidants containing phosphor.

The antioxidants having a phenol structure are antioxidants having a phenol skeleton. Examples of the antioxidants having a phenol structure include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis [methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and pentaerythritol tetrakis [3-(3,5-di-tert-butyl-4-hydroxyphenyl)propionate]. These antioxidants may be used alone or in combination of two or more thereof.

The interlayer film for a laminated glass may contain, if needed, additives such as light stabilizers, antistatic agents, blue pigments, blue dyes, green pigments, and green dyes.

The interlayer film for a laminated glass may have a single layer structure consisting only of a luminescent layer containing the luminescent material or a multilayer structure in which the luminescent layer containing the luminescent material and a different layer are stacked.

In the case where the interlayer film for a laminated glass has a multilayer structure, the luminescent layer containing the luminescent material may be disposed on the entire or part of a face of the interlayer film for a laminated glass, and may be disposed on the entire or part of a face in a direction perpendicular to the thickness direction of the interlayer film for a laminated glass. In the case where the luminescent layer containing the luminescent material is partially disposed, a gradation pattern can be controlled to be displayed only at the disposed part as a luminescent area without being displayed at the other part as a non-luminescent area.

In the case where the interlayer film for a laminated glass has a multilayer structure, an interlayer film for a laminated glass with various functions can be produced by controlling the components constituting the luminescent layer containing the luminescent material and a different layer.

For example, in order to impart sound insulation properties to the interlayer film for a laminated glass, the amount of the plasticizer (hereafter, also referred to as amount X) relative to 100 parts by weight of the thermoplastic resin in the luminescent layer containing the luminescent material may be controlled to be more than the amount of the plasticizer (hereafter, also referred to as amount Y) relative to 100 parts by weight of the thermoplastic resin in the different layer. In this case, the amount X is more than the amount Y preferably by 5 parts by weight or more, more preferably by 10 parts by weight or more, still more preferably by 15 parts by weight or more. For allowing the interlayer film for a laminated glass to have higher penetration resistance, the difference between the amount X and the amount Y is preferably 50 parts by weight or less, more preferably 40 parts by weight or less, still more preferably 35 parts by weight or less. The difference between the amount X and the amount Y is calculated based on the equation: (difference between the amount X and the amount Y)=(the amount X−the amount Y).

The lower limit of the amount X is preferably 45 parts by weight and the upper limit thereof is preferably 80 parts by weight. The lower limit is more preferably 50 parts by weight and the upper limit is more preferably 75 parts by weight. The lower limit is still more preferably 55 parts by weight and the upper limit is still more preferably 70 parts by weight. When the amount X is adjusted to the preferable lower limit or more, high sound insulation properties can be exerted. When the amount X is adjusted to the preferable upper limit or less, the plasticizer can be prevented from bleeding out, so that a reduction in the transparency or the adhesiveness of the interlayer film for a laminated glass can be prevented.

The lower limit of the amount Y is preferably 20 parts by weight and the upper limit thereof is preferably 45 parts by weight. The lower limit is more preferably 30 parts by weight and the upper limit is more preferably 43 parts by weight. The lower limit is still more preferably 35 parts by weight and the upper limit is still more preferably 41 parts by weight. When the amount Y is adjusted to the preferable lower limit or more, high penetration resistance can be exerted. When the amount Y is adjusted to the preferable upper limit or less, the plasticizer can be prevented from bleeding out, so that a reduction in the transparency or the adhesiveness of the interlayer film for a laminated glass can be prevented.

In order to impart sound insulation properties to the interlayer film for a laminated glass of the present invention, the thermoplastic resin in the luminescent layer is preferably a polyvinyl acetal X. The polyvinyl acetal X can be prepared by acetalization of polyvinyl alcohol with an aldehyde. The polyvinyl alcohol can be commonly prepared by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or higher, the penetration resistance of the interlayer film for a laminated glass to be obtained can be improved. When the average degree of polymerization of the polyvinyl alcohol is 5,000 or lower, formability of the luminescent layer can be ensured. The lower limit of the average degree of polymerization of the polyvinyl alcohol is more preferably 500 and the upper limit thereof is more preferably 4,000. The average degree of polymerization of the polyvinyl alcohol is determined by a method in accordance with "Testing methods for polyvinyl alcohol" in JIS K 6726.

The lower limit of the carbon number of an aldehyde used for acetalization of the polyvinyl alcohol is preferably 4 and the upper limit thereof is preferably 6. When an aldehyde having 4 or more carbon atoms is used, a sufficient amount of the plasticizer can be stably contained so that excellent sound insulation properties can be obtained. Moreover, bleeding out of the plasticizer can be prevented. When an aldehyde having 6 or less carbon atoms is used, synthesis of the polyvinyl acetal X is facilitated to ensure the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the plasticizer can be contained in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage (mol %) of the mol fraction obtained by dividing the amount of ethylene groups to which hydroxy groups are bonded by the amount of all the ethylene groups in the main chain. The amount of ethylene groups to which hydroxy groups are bonded can be determined by measuring the amount of ethylene groups to which hydroxy groups are bonded in the polyvinyl acetal X by a method in accordance with "Testing methods for polyvinyl butyral" in JIS K 6728.

The lower limit of the acetal group content of the polyvinyl acetal X is preferably 60 mol % and the upper limit thereof is preferably 85 mol %. When the acetal group content of the polyvinyl acetal X is 60 mol % or more, the luminescent layer has higher hydrophobicity and can contain the plasticizer in an amount needed for exhibiting sound insulation properties, and bleeding out of the plasticizer and whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol % or more.

The acetal group content can be determined by measuring the amount of ethylene groups to which acetal groups are bonded in the polyvinyl acetal X by a method in accordance with "Testing methods for polyvinyl butyral" in JIS K 6728.

The lower limit of the acetyl group content of the polyvinyl acetal X is preferably 0.1 mol % and the upper limit thereof is preferably 30 mol %. When the acetyl group content of the polyvinyl acetal X is 0.1 mol % or more, the plasticizer can be contained in an amount needed for exhibiting sound insulation properties, and bleeding out of the plasticizer can be prevented. When the acetyl group content of the polyvinyl acetal X is 30 mol % or less, the luminescent layer has higher hydrophobicity to prevent whitening. The lower limit of the acetyl group content of the polyvinyl acetal X is more preferably 1 mol %, still more preferably 5 mol %, particularly preferably 8 mol %, and the upper limit thereof is more preferably 25 mol %, still more preferably 20 mol %.

The acetyl group content is a value in percentage (mol %) of the mol fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain.

The polyvinyl acetal X is especially preferably a polyvinyl acetal with the acetyl group content of 8 mol % or more or a polyvinyl acetal with the acetyl group content of less than 8 mol % and the acetal group content of 65 mol % or more. In this case, the luminescent layer can readily contain the plasticizer in an amount needed for exhibiting sound insulation properties. The polyvinyl acetal X is more preferably a polyvinyl acetal having the acetyl group content of 8 mol % or more or a polyvinyl acetal having the acetyl group content of less than 8 mol % and the acetal group content of 68 mol % or more.

In order to impart sound insulation properties to the interlayer film for a laminated glass of the present invention, the thermoplastic resin in the different layer is preferably a polyvinyl acetal Y. The polyvinyl acetal Y preferably has a greater hydroxy group content than the polyvinyl acetal X.

The polyvinyl acetal Y can be prepared by acetalization of polyvinyl alcohol with an aldehyde. The polyvinyl alcohol can be commonly obtained by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or more, the penetration resistance of the interlayer film for a laminated glass can be improved. When the average degree of polymerization of the polyvinyl alcohol is 5,000 or less, the formability of the different layer can be ensured. The lower limit of the average degree of polymerization of the polyvinyl alcohol is more preferably 500 and the upper limit thereof is more preferably 4,000.

The lower limit of the carbon number of an aldehyde used for acetalization of the polyvinyl alcohol is preferably 3 and the upper limit thereof is preferably 4. When the aldehyde having 3 or more carbon atoms is used, the penetration resistance of the interlayer film for a laminated glass is improved. When the aldehyde having 4 or less carbon atoms is used, the productivity of the polyvinyl acetal Y is improved. The C3-C4 aldehyde may be a linear or branched aldehyde, and examples thereof include n-butyraldehyde.

The upper limit of the hydroxy group content of the polyvinyl acetal Y is preferably 33 mol % and the lower limit thereof is preferably 28 mol %. When the hydroxy group content of the polyvinyl acetal Y is 33 mol % or less, whitening of the interlayer film for a laminated glass can be prevented. When the hydroxy group content of the polyvinyl acetal Y is 28 mol % or more, the penetration resistance of the interlayer film for a laminated glass can be improved.

The lower limit of the acetal group content of the polyvinyl acetal Y is preferably 60 mol % and the upper limit thereof is preferably 80 mol %. When the acetal group content is 60 mol % or more, the plasticizer in an amount needed for exhibiting sufficient penetration resistance can be contained. When the acetal group content is 80 mol % or less, the adhesiveness between the different layer and glass can be ensured. The lower limit of the acetal group content of the polyvinyl acetal Y is more preferably 65 mol % and the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the different layer has higher hydrophobicity, thereby preventing whitening. The upper limit of the acetyl group content of the polyvinyl acetal Y is more preferably 2 mol %, and the lower limit thereof is preferably 0.1 mol %.

The hydroxy group content, acetal group content, and acetyl group content of the polyvinyl acetal Y can be measured by the same methods as those described for the polyvinyl acetal X.

In order to impart heat insulation properties to the interlayer film for a laminated glass, for example, one, two, or all of the luminescent layer containing a luminescent material and different layer(s) may contain a heat ray absorber.

The heat ray absorber is not particularly limited as long as it blocks infrared rays. Preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

The thickness of the interlayer film for a laminated glass is not particularly limited. The lower limit of the thickness is preferably 50 µm and the upper limit thereof is preferably 1,700 µm. The lower limit is more preferably 100 µm and the upper limit is more preferably 1,000 µm. The upper limit is still more preferably 900 µm. The lower limit of the thickness of the interlayer film for a laminated glass means the thickness of the thinnest part of the interlayer film for a laminated glass. The upper limit of the thickness of the interlayer film for a laminated glass means the thickness of the thickest part of the interlayer film for a laminated glass. In the case where the interlayer film for a laminated glass has a multilayer structure, the thickness of the luminescent layer containing a luminescent material is not particularly limited. The lower limit thereof is preferably 50 µm and the upper limit is preferably 1,000 µm. When the luminescent layer containing a luminescent material has a thickness within this range, the contrast of luminescence is sufficiently high under irradiation with light having a specific wavelength. The lower limit of the thickness of the luminescent layer containing a luminescent material is more preferably 80 µm and the upper limit thereof is more preferably 500 µm. The lower limit is still more preferably 90 µm and the upper limit is still more preferably 300 µm.

The interlayer film for a laminated glass of the present invention may have a wedge-shaped cross section. In the case where the interlayer film for a laminated glass has a wedge-shaped cross section, variations in how the color changes in the gradation pattern can be increased. In an exemplary gradation pattern, the color sharply changes from an end portion toward the center of the laminated glass. In another exemplary gradation pattern, the color moderately changes from an end portion toward the center of the laminated glass. From the standpoint of displaying a gradation pattern of excellent design in which color irregularity is less likely to occur, the upper limit of the wedge angle θ of the wedge shape is preferably 1 mrad. In the case where the interlayer film for a laminated glass having a wedge-shaped cross section is produced by, for example, extrusion molding a resin composition using an extruder, the interlayer film may be thinnest at a region slightly inside of the edge on a thinner side thereof (specifically, when the distance from one side to the other side is X, the region of 0X to 0.2X from the edge on the thinner side toward the inside) and thickest at a region slightly inside of the edge on a thicker side thereof (specifically, when the distance from one side to the other side is X, the region of 0X to 0.2X from the edge on the thicker side toward the inside). Herein, such a shape is included in the wedge shape.

In the case of the interlayer film for a laminated glass of the present invention having a wedge-shaped cross section, it may have a multilayer structure including a luminescent layer and a different layer (hereafter, also referred to as a "shape-adjusting layer"). The cross-sectional shape of the entire interlayer film for a laminated glass can be controlled to have a wedge shape with a certain wedge angle by controlling the thickness of the luminescent layer to be within a certain range and stacking the shape-adjusting layer. Alternatively, the cross-sectional shape of the entire interlayer film for a laminated glass can be controlled to have a wedge shape with a certain wedge angle by using the luminescent layer and the shape-adjusting layer at least one of which has a wedge shape. The shape-adjusting layer may be stacked on only one or both of the faces of the luminescent layer. Further, multiple shape-adjusting layers may be stacked.

The luminescent layer may have a wedge-shaped cross section or a rectangular cross section. Preferably, the difference between the maximum thickness and the minimum thickness of the luminescent layer is 100 µm or less. In this case, occurrence of unintended color irregularity in the gradation pattern can be suppressed. The difference between the maximum thickness and the minimum thickness of the luminescent layer is more preferably 95 µm or less, still more preferably 90 µm or less.

In the case of the interlayer film for a laminated glass of the present invention having a wedge-shaped cross section, the thickness of the luminescent layer is not particularly limited. The lower limit of the thickness is preferably 50 µm and the upper limit thereof is preferably 700 µm. When the luminescent layer has a thickness within the above range, the gradation pattern of excellent design can be displayed. The lower limit of the luminescent layer is more preferably 70 µm and the upper limit thereof is more preferably 400 µm. The lower limit is still more preferably 80 µm and the upper limit is still more preferably 150 µm. The lower limit of the thickness of the luminescent layer means the thickness of the thinnest part of the luminescent layer. The upper limit of the thickness of the luminescent layer means the thickness of the thickest part of the luminescent layer.

The shape-adjusting layer is stacked on the luminescent layer to control the cross-sectional shape of the entire interlayer film for a laminated glass into a wedge shape with a certain wedge angle. Preferably, the shape-adjusting layer has a wedge-shaped, triangular, trapezoidal, or rectangular cross section. The cross-sectional shape of the entire interlayer film for a laminated glass can be controlled to be a wedge shape with a certain wedge angle by stacking a shape-adjusting layer having a wedge-shaped, triangular, or trapezoidal cross section. Moreover, the cross-sectional shape of the entire interlayer film for a laminated glass can be controlled using multiple shape-adjusting layers in combination.

The thickness of the shape-adjusting layer is not particularly limited. In view of the practical aspect and sufficient enhancement of the adhesive force and penetration resistance, the lower limit of the thickness is preferably 10 µm and the upper limit thereof is preferably 1,000 µm. The lower limit is more preferably 200 µm and the upper limit is more preferably 800 µm. The lower limit is still more preferably 300 µm. The lower limit of the thickness of the shape-adjusting layer means the thickness of the thinnest part of the shape-adjusting layer. The upper limit of the thickness of the shape-adjusting layer means the thickness of the thickest part of the shape-adjusting layer. When multiple shape-adjusting layers are used in combination, the thickness of the shape-adjusting layer means a total thickness of the shape-adjusting layers.

FIGS. 1 to 3 each illustrate a schematic view of an exemplary embodiment of the interlayer film for a laminated glass of the present invention having a wedge-shaped cross section. For the convenience of illustration, the interlayer films for a laminated glass and the layers forming the interlayer films for a laminated glass in FIGS. 1 to 3 are illustrated to have different thickness and wedge angles θ from those of the actual products.

FIG. 1 illustrates a cross section of an interlayer film for a laminated glass 1 in the thickness direction. The interlayer film for a laminated glass 1 has a two-layer structure in which a shape-adjusting layer 12 is stacked on one face of a luminescent layer 11 containing a luminescent material. The entire interlayer film for a laminated glass 1 is allowed to have a wedge shape with a wedge angle θ of 0.1 to 1 mrad by using the shape-adjusting layer 12 having a wedge, triangular, or trapezoidal shape together with the luminescent layer 11 having a rectangular shape.

FIG. 2 illustrates a cross section of an interlayer film for a laminated glass 2 in the thickness direction. The interlayer film for a laminated glass 2 has a three-layer structure in which a shape-adjusting layer 22 and a shape-adjusting layer 23 are stacked on respective surfaces of a luminescent layer 21 containing a luminescent material. The entire interlayer film for a laminated glass 2 is allowed to have a wedge shape with a wedge angle θ of 0.1 to 1 mrad by using the shape-adjusting layer 22 having a wedge, triangular, or trapezoidal shape together with the luminescent layer 21 and the shape-adjusting layer 23 both having a rectangular shape with a certain thickness.

FIG. 3 illustrates a cross section of an interlayer film for a laminated glass 3 in the thickness direction. The interlayer film for a laminated glass 3 has a three-layer structure in which a shape-adjusting layer 32 and a shape-adjusting layer 33 are stacked on respective surfaces of a luminescent layer 31 containing a luminescent material. The entire interlayer film for a laminated glass 3 is allowed to have a wedge shape with a wedge angle θ of 0.1 to 1 mrad by using the luminescent layer 31 having a moderate wedge shape with the difference between the maximum thickness and the minimum thickness of 100 µm or less and stacking the wedge-shaped shape-adjusting layers 32 and 33.

The interlayer film for a laminated glass may be produced by any method. In an exemplary method, a plasticizer solution containing a plasticizer and a luminescent material is well mixed with a thermoplastic resin to prepare a resin composition for interlayer films for a laminated glass. Then, the resin composition for interlayer films for a laminated glass is extruded using an extruder to produce an interlayer film for a laminated glass.

The laminated glass includes a pair of glass plates and the interlayer film for a laminated glass interposed between the pair of glass plates.

The glass plates may be commonly used transparent plate glass. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass in which a UV light-shielding coat layer is formed on the surface of glass. However, such glass is preferably used as a glass plate on a side opposite to the side irradiated with light having a specific wavelength. Moreover, organic plastic plates such as polyethylene terephthalate, polycarbonate, or polyacrylate plates may also be used.

As the glass plates, two or more kinds of glass plates may be used. Exemplary cases thereof include a laminated glass in which the interlayer film for a laminated glass is sandwiched between a transparent float plate glass and a colored glass plate such as green glass. Moreover, as the glass plates, two or more kinds of glass plates different in the thickness may be used.

The light source emits light of excitation wavelength for the luminescent material in the laminated glass and allows a gradation pattern to be displayed on the laminated glass by emitting the light. The emitted light includes light of excitation wavelength for the luminescent material, and is determined in accordance with the type of the luminescent material. Examples of the light source include a spot light source (e.g., "LC-8" available from Hamamatsu Photonixs K.K.); a xenon flash lamp (e.g., "CW lamp" available from Heraeus Holding), and a black light ("Carry hand" available from Iuchi Seieido Co., Ltd.).

The output power of the emitted light is not particularly limited, and is preferably 10 mW/cm$^2$ or higher. Irradiation with light at 10 mW/cm$^2$ or higher enables display of a gradation pattern of excellent design. The lower limit of the output power of the emitted light is more preferably 30 mW/cm$^2$, still more preferably 50 mW/cm$^2$, particularly preferably 100 mW/cm$^2$. The upper limit of the output power of the emitted light is not particularly limited. From the standpoint of avoiding unnecessary size increase of the device, the output power is preferably 1,000 mW/cm$^2$ or lower.

By controlling the output power of the emitted light, the gradation pattern to be displayed can be changed at will.

The output power of the emitted light can be measured by the irradiation intensity measurement with a laser power meter (e.g., "Beam track power sensor 3A-QUAD" available from Ophir Japan Ltd.) arranged at a position of 10 cm distant from the light source.

The emitted light has an irradiation diameter of preferably 0.1 cm or larger. The irradiation diameter of 0.1 cm or larger facilitates display of a gradation pattern of excellent design. The irradiation diameter of the emitted light is more preferably 0.5 cm or larger, still more preferably 1.0 cm or larger, particularly preferably 3.0 cm or larger. The upper limit of the irradiation diameter of the emitted light is not particularly limited, and is practically 50 cm or lower in consideration of the size of the laminated glass.

The irradiation diameter of the emitted light can be measured by the irradiation intensity measurement with a laser power meter (e.g., "Beam track power sensor 3A-QUAD" available from Ophir Japan Ltd.) arranged at a position of 10 cm distant from the light source. At that time, especially in the case where the light to be emitted is not in the circular shape or is in the elliptical shape, the diameter in a direction perpendicular to the optical axis and in a plane along the thickness direction of the laminated glass is determined as the irradiation diameter.

In the display device of the present invention, the laminated glass and the light source are disposed such that the laminated glass is irradiated from its periphery toward the inside with the light emitted from the light source.

The periphery of the laminated glass as used herein refers to a space at 30 cm distant from an end portion of the laminated glass. Here, in the case where the light emitted from the light source can be guided from the periphery toward the inside of the laminated glass using a light guide material such as a light guide film or an optical fiber, the light source itself needs not to be disposed at the periphery of the laminated glass.

FIG. 4 includes schematic views each illustrating a positional relation between the laminated glass and the light source.

In FIG. 4(a), a laminated glass 4 has a structure in which an interlayer film for a laminated glass 41 containing a thermoplastic resin and a luminescent material is interposed between a pair of glass plates 42. A light source 5 is disposed such that the laminated glass 4 is irradiated with the emitted light from its periphery toward the inside.

Upon irradiation with the light from the light source 5, the luminescent material contained in the interlayer film for a laminated glass 41 becomes luminous. Due to the irradiation with light from the periphery toward the inside, the luminescence intensity at a portion closer to the light source is higher and is lower at a portion further from the light source as the light decays. As a result, a gradation pattern in which the luminescence intensity is varied from the portion closer to the light source to the portion further from the light source is displayed. The gradation pattern can be changed by adjusting the output power of the irradiation light and can be turned off when the irradiation with light is stopped.

In FIG. 4(b), an angle 6 formed between the surface direction of the laminated glass 4 and the optical axis of the light emitted from the light source 5 is preferably 30° or smaller, more preferably 15° or smaller. When the angle 6 is 30° or smaller, the contrast of the gradation pattern can be improved. For allowing the light to reach the center of the laminated glass to increase the range where the gradation pattern can be displayed, the angle 6 formed between the surface direction of the laminated glass 4 and the optical axis of the light emitted from the light source 5 is preferably 0.01° or larger, more preferably 0.05° or larger, still more preferably 0.1° or larger, particularly preferably 0.5° or larger. The angle 6 formed between the surface direction of the laminated glass 4 and the optical axis of the light emitted from the light source 5 may be 0° depending on the gradation pattern to be displayed. However, for displaying the gradation pattern with a sufficient length for visual recognition, the angle 6 is preferably larger than 0°.

The gradation pattern can be changed also by adjusting the angle 6.

The display device of the present invention is suitably used for applications requiring the design, privacy protection, and light shielding effect because the gradation pattern displayed on the laminated glass can be changed at will and the display state can be switched to a transparent state. For example, the display device of the present invention is suitable for an automobile roof glass and a building window glass.

The present invention also encompasses an automobile roof glass and a building window glass each including the display device of the present invention.

Advantageous Effects of Invention

The present invention can provide a display device capable of displaying a gradation pattern in which the gradation pattern on a laminated glass can be changed at will and a display state can be switched to a transparent state, and an automobile roof glass and a building window glass each including the display device.

DESCRIPTION OF EMBODIMENTS

Figure 1:
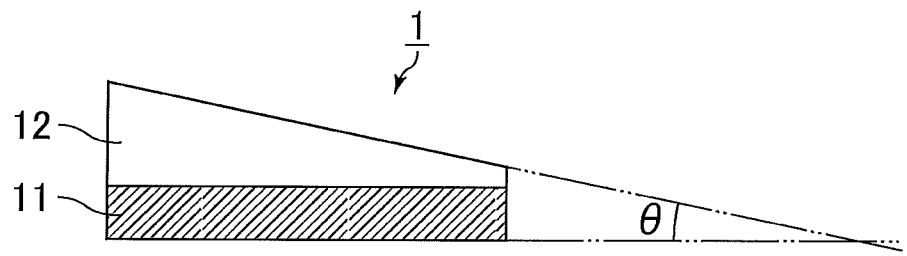
FIG. 1 illustrates a schematic view of an exemplary embodiment of the interlayer film for a laminated glass of the present invention having a wedge-shaped cross section.
Figure 2:
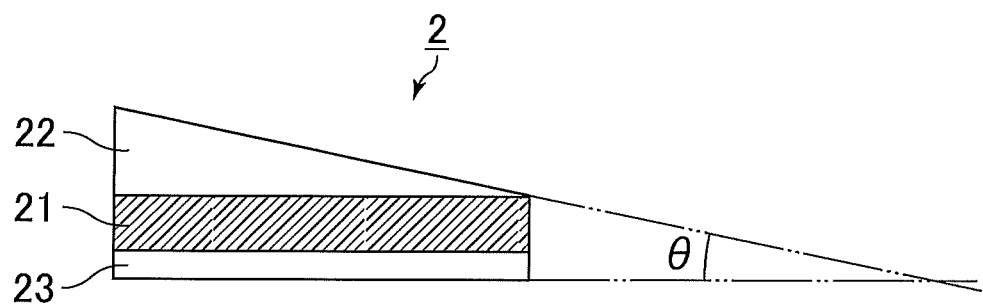
FIG. 2 illustrates a schematic view of an exemplary embodiment of the interlayer film for a laminated glass of the present invention having a wedge-shaped cross section.
Figure 3:
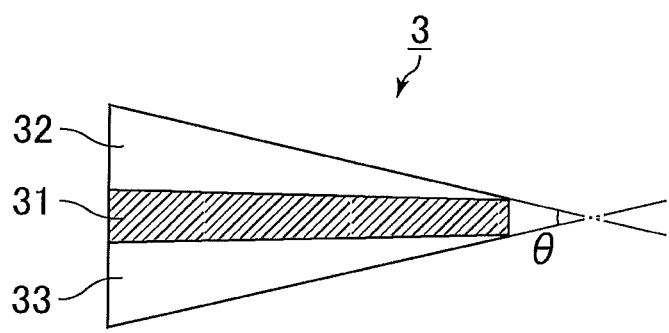
FIG. 3 illustrates a schematic view of an exemplary embodiment of the interlayer film for a laminated glass of the present invention having a wedge-shaped cross section.
Figure 4:
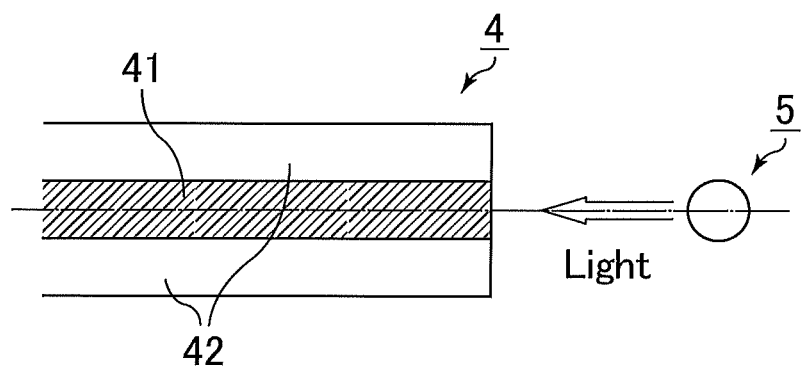
FIG. 4 includes schematic views each illustrating a positional relation between a laminated glass and a light source of the display device of the present invention.
Figure 4:
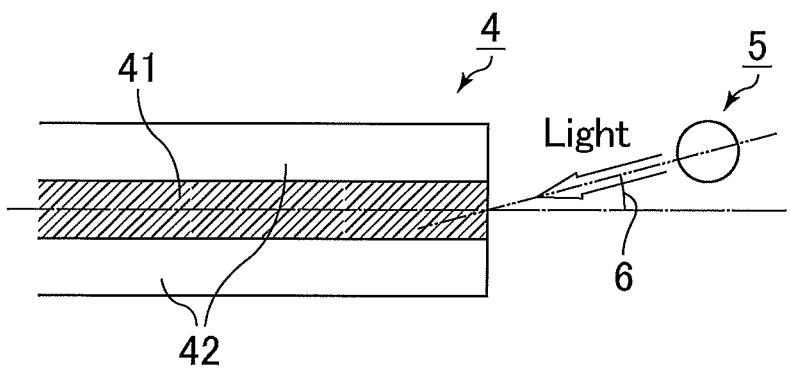

The present invention is more specifically described in the following with reference to, but not limited to, examples.
(Luminescent Material)

The following luminescent materials are used in the examples.

$Eu(TFA)_3phen$
$Eu(HFA)_3phen$
$Tb(HFA)_3phen$
$Tb(TFA)_3phen$
Diethyl-2,5-dihydroxylterephthalate ("Diethyl 2,5-dihydroxyterephthalate" available from Sigma-Aldrich)

Four luminescent materials other than diethyl-2,5-dihydroxylterephthalate that is a commercial product were prepared as follows.

(1) Preparation of $Eu(TFA)_3phen$

Europium acetate ($Eu(CH_3COO)_3$) in an amount of 12.5 mmol was dissolved in 50 mL of distilled water. To the solution was added 33.6 mmol of trifluoroacetylacetone (TFA, $CH_3COCH_2COCF_3$), and the mixture was stirred at room temperature for 3 hours. The precipitated solid was filtered, washed with water, and recrystallized using methanol and distilled water to give $Eu(TFA)_3(H_2O)_2$. Then, 5.77 g of the resulting complex ($Eu(TFA)_3(H_2O)_2$) and 2.5 g of 1,10-phenanthroline(phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, $Eu(TFA)_3phen$ was obtained.

(2) Preparation of $Eu(HFA)_3phen$

Europium acetate ($Eu(CH_3COO)_3$) in an amount of 12.5 mmol was dissolved in 50 mL of distilled water. To the solution was added 33.6 mmol of hexafluoroacetylacetone (HFA), and the mixture was stirred at room temperature for 3 hours. The precipitated solid was filtered, washed with water, and recrystallized using methanol and distilled water to give $Eu(HFA)_3(H_2O)_2$. Then, 7.20 g of the obtained complex ($Eu(HFA)_3(H_2O)_2$) and 2.5 g of 1,10-phenanthroline(phen) were added to 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, $Eu(HFA)_3phen$ was obtained.

(3) Preparation of $Tb(HFA)_3phen$

Terbium acetate ($Tb(CH_3COO)_3$) in an amount of 12.5 mmol was dissolved in 50 mL of distilled water. To the solution was added 33.6 mmol of hexafluoroacetylacetone (HFA, $CF_3COCH_2COCF_3$), and the mixture was stirred at room temperature for 3 hours. The precipitated solid was filtered, washed with water, and recrystallized using methanol and distilled water to give $Tb(HFA)_3(H_2O)_2$. Then, 7.26 g of the obtained complex $(Tb(HFA)_3(H_2O)_2)$ and 2.5 g of 1,10-phenanthroline(phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, $Tb(HFA)_3phen$ was obtained.

(4) Preparation of $Tb(TFA)_3phen$ $Tb(TFA)_3phen$ was obtained in the same manner as in the case of $Tb(HFA)_3phen$, except that trifluoroacetylacetone was used instead of hexafluoroacetylacetone.

(Thermoplastic Resin)

In examples, polyvinyl butyral prepared by the following procedure was used as a thermoplastic resin.

To a 2 m$^3$ reactor equipped with a stirrer were charged 1,700 kg of a 7.5% by mass aqueous solution of PVA (degree of polymerization: 1,700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was filtered. The solid was washed ten times with a 10-fold amount (by mass) of ion exchange water. The washed solid was sufficiently neutralized using a 0.3% by mass sodium hydrogen carbonate aqueous solution and was then washed ten times with a 10-fold amount (by mass) of ion exchange water. The resulting solid was dehydrated and dried, thereby obtaining polyvinyl butyral (PVB).

Examples 1 to 6

(1) Production of Interlayer Film for a Laminated Glass and Laminated Glass

A luminescent plasticizer solution was prepared by adding 0.2 parts by weight of $Eu(TFA)_3phen$ to 40 parts by weight of triethylene glycol di-2-ethylhexanoate (3GO). The entire amount of the obtained plasticizer solution was mixed and sufficiently kneaded with 100 parts by weight of polyvinyl butyral using a mixing roll to give a resin composition.

The obtained resin composition was extruded using an extruder to provide an interlayer film for a laminated glass (thickness: 760 μm).

The total amount of sodium, potassium, and magnesium in the obtained interlayer film for a laminated glass measured with an ICP emission analyzer ("ICPE-9000" available from Shimadzu Corporation) was 5 ppm.

The resulting interlayer film for a laminated glass was sandwiched between a pair of clear glass plates (thickness: 2.5 mm, 5 cm in length x 5 cm in width) to prepare a laminate. The laminate was pressed under vacuum at 90° C. for 30 minutes to be press-bonded using a vacuum laminator. The press-bonded laminate was subjected to further 20-minute press-bonding under 14 MPa at 140° C. using an autoclave, thereby obtaining a laminated glass.

(2) Production of Display Device

A display device was obtained by combining the obtained laminated glass and a mercury light source ("REX-250" available from Asahi Spectra Co., Ltd.) in which the output power or wavelength of the light was adjustable by adjusting the output power of the light source and using a band-pass filter ("LX0405" available from Asahi Spectra Co., Ltd.), a rod lens (Asahi Spectra Co., Ltd.), and a fiber (Asahi Spectra Co., Ltd.). In the obtained display device, the optical axis was positioned at the center in the thickness direction of the interlayer film for a laminated glass in the laminated glass and the light source was positioned at a position of 1 cm distant from an end portion of the laminated glass.

(3) Display of Gradation Pattern

The obtained display device was placed in a dark room and subjected to irradiation with light in which the output power of the light source and the angle formed between the surface direction of the laminated glass and the optical axis of the light emitted from the light source were set as shown in Table 1.

Luminance meters ("SR-3AR" available from Topcon Technohouse Corporation) were set orthogonally to the surface direction of the laminated glass and at positions at 0 mm, 10 mm, 30 mm, and 50 mm from the end portion of the laminated glass on the light source side for measurement of the luminance of the laminated glass.

As a result, in Examples 1 to 5, a very beautiful gradation pattern in which the luminance was changed according to the distance from the end portion was displayed. In Example 6 in which the irradiation with light was not carried out, the laminated glass was transparent.

TABLE 1

|  |  |  |  | Example 1 | Example 2 | Example 3 | Example 4 | Example 5 | Example 6 |
|---|---|---|---|---|---|---|---|---|---|
| Interlayer film | Thermoplastic resin | PVB | phr | 100 | | | | | |
|  | Luminescent material | Type | — | $Eu(TFA)_3phen$ | | | | | |
|  |  | Amount | phr | 0.2 | | | | | |
|  | Plasticizer | 3GO | phr | 40 | | | | | |
| Light source | Wavelength | | nm | 405 | 405 | 405 | 405 | 405 | Not irradiated |
|  | Intensity | | mW/cm$^2$ | 100 | 50 | 300 | 100 | 100 | |
|  | Angle | | ° | 5 | 5 | 5 | 15 | 30 | |
| Evaluation | Luminance (0 mm from end portion) | | cd/m$^2$ | 1000 | 500 | 3000 | 1000 | 1000 | 0 |
|  | Luminance (10 mm from end portion) | | cd/m$^2$ | 850 | 400 | 2500 | 900 | 950 | 0 |
|  | Luminance (30 mm from end portion) | | cd/m$^2$ | 550 | 200 | 1800 | 700 | 850 | 0 |
|  | Luminance (50 mm from end portion) | | cd/m$^2$ | 250 | 100 | 1200 | 500 | 750 | 0 |

Examples 7 to 22

An interlayer film for a laminated glass, a laminated glass, and a display device were produced in the same manner as in Example 1, except that the type and amount of the luminescent material, the intensity and irradiation diameter of the light, and the angle formed between the surface direction of the laminated glass and the optical axis of the light emitted from the light source were changed as shown in Tables 2 to 4.

As a result of the confirmation of display of the gradation pattern in the same manner as in Examples 1 to 5, display of a very beautiful gradation pattern in which the luminance was changed according to the distance from the end portion was confirmed.

TABLE 2

| | | | | Example 7 | Example 8 | Example 9 | Example 10 | Example 11 | Example 12 | Example 13 | Example 14 | Example 15 |
|---|---|---|---|---|---|---|---|---|---|---|---|---|
| Interlayer film | Thermoplastic resin | PVB | phr | 100 | | | 100 | | | | 100 | |
| | Luminescent material | Type | — | Eu(TFA)$_3$phen | | | Eu(TFA)$_3$phen | | | | Eu(TFA)$_3$phen | |
| | | Amount | phr | 0.2 | | | 0.05 | | | | 0.4 | |
| | Plasticizer | 3GO | phr | 40 | | | 40 | | | | 40 | |
| Light source | Wavelength | | nm | 405 | 405 | 405 | 405 | 405 | 405 | 405 | 405 | 405 |
| | Intensity | | mW/cm$^2$ | 100 | 100 | 50 | 300 | 100 | 100 | 100 | 100 | 100 |
| | Irradiation diameter | | cmϕ | 3.0 | 3.0 | 3.0 | 3.0 | 3.0 | 3.0 | 3.0 | 3.0 | 3.0 |
| | Angle | | ° | 0.5 | 5 | 5 | 5 | 15 | 30 | 0.5 | 5 | 30 |
| Evaluation | Luminance (0 mm from end portion) | | cd/m$^2$ | 1000 | 240 | 120 | 750 | 240 | 240 | 240 | 2000 | 2000 |
| | Luminance (10 mm from end portion) | | cd/m$^2$ | 580 | 210 | 110 | 670 | 220 | 230 | 170 | 1600 | 1800 |
| | Luminance (30 mm from end portion) | | cd/m$^2$ | 70 | 140 | 70 | 520 | 180 | 210 | 30 | 800 | 1400 |
| | Luminance (50 mm from end portion) | | cd/m$^2$ | 0 | 80 | 40 | 350 | 140 | 190 | 0 | 200 | 1000 |

TABLE 3

| | | | | Example 16 | Example 17 | Example 18 | Example 19 |
|---|---|---|---|---|---|---|---|
| Interlayer film | Thermoplastic resin | PVB | phr | 100 | 100 | 100 | 100 |
| | Luminescent material | Type | — | Eu(HFA)$_3$phen | Tb(TFA)$_3$phen | Tb(HFA)$_3$phen | Diethyl-2,5-dihydroxyterephthalate |
| | | Amount | phr | 0.2 | 0.2 | 0.2 | 0.05 |
| | Plasticizer | 3GO | phr | 40 | 40 | 40 | 40 |
| Light source | Wavelength | | nm | 405 | 405 | 405 | 405 |
| | Intensity | | mW/cm$^2$ | 100 | 100 | 100 | 100 |
| | Irradiation diameter | | cmϕ | 3.0 | 3.0 | 3.0 | 3.0 |
| | Angle | | ° | 5 | 5 | 5 | 5 |
| Evaluation | Luminance (0 mm from end portion) | | cd/m$^2$ | 1050 | 2000 | 2100 | 2500 |
| | Luminance (10 mm from end portion) | | cd/m$^2$ | 900 | 1700 | 1800 | 2180 |
| | Luminance (30 mm from end portion) | | cd/m$^2$ | 600 | 1100 | 1200 | 1540 |
| | Luminance (50 mm from end portion) | | cd/m$^2$ | 300 | 500 | 600 | 900 |

TABLE 4

| | | | | Example 20 | Example 21 | Example 22 |
|---|---|---|---|---|---|---|
| Interlayer film | Thermoplastic resin | PVB | phr | 100 | 100 | 100 |
| | Luminescent material | Type | — | Eu(TFA)$_3$phen | Eu(TFA)$_3$phen | Eu(TFA)$_3$phen |
| | | Amount | phr | 0.4 | 0.4 | 0.4 |
| | Plasticizer | 3GO | phr | 40 | 40 | 40 |
| Light source | Wavelength | | nm | 405 | 405 | 405 |
| | Intensity | | mW/cm$^2$ | 100 | 100 | 100 |
| | Irradiation diameter | | cmϕ | 0.5 | 1.0 | 5.0 |
| | Angle | | ° | 5 | 5 | 5 |
| Evaluation | Luminance (0 mm from end portion) | | cd/m$^2$ | 2000 | 2000 | 2000 |
| | Luminance (10 mm from end portion) | | cd/m$^2$ | 1300 | 1400 | 1800 |

TABLE 4-continued

| | | Example 20 | Example 21 | Example 22 |
|---|---|---|---|---|
| Luminance (30 mm from end portion) | cd/m² | 50 | 200 | 1400 |
| Luminance (50 mm from end portion) | cd/m² | 0 | 0 | 800 |

INDUSTRIAL APPLICABILITY

The present invention can provide a display device capable of displaying a gradation pattern in which the gradation pattern displayed on a laminated glass can be changed at will and a display state can be switched to a transparent state, and an automobile roof glass and a building window glass each including the display device.

REFERENCE SIGNS LIST

1 Interlayer film for a laminated glass
11 Luminescent layer
12 Shape-adjusting layer
2 Interlayer film for a laminated glass
21 Luminescent layer
22 Shape-adjusting layer
23 Shape-adjusting layer
3 Interlayer film for a laminated glass
31 Luminescent layer
32 Shape-adjusting layer
33 Shape-adjusting layer
4 Laminated glass
41 Interlayer film for a laminated glass
42 Glass plate
5 Light source
6 Angle formed between surface direction of laminated glass 4 and optical axis of light emitted from light source 5

The invention claimed is:

1. A display device capable of displaying a gradation pattern, comprising:
   a laminated glass comprising a pair of glass plates and an interlayer film for a laminated glass,
      wherein the interlayer film for a laminated glass contains a thermoplastic resin and a luminescent material,
      wherein the interlayer film for a laminated glass is interposed between the pair of glass plates, and
      wherein the interlayer film directly contacts each of the pair of glass plates; and
   a light source configured to emit light of excitation wavelength for the luminescent material,
   the laminated glass and the light source being disposed such that the laminated glass is irradiated from its periphery toward the inside with the light emitted from the light source,
   wherein an angle formed between a surface direction of the laminated glass and an optical axis of the light emitted from the light source is 0.1° or larger.

2. The display device capable of displaying a gradation pattern according to claim 1,
   wherein the surface direction of the laminated glass and the optical axis of the light emitted from the light source form an angle of 30° or smaller.

3. The display device capable of displaying a gradation pattern according to claim 1,
   wherein the luminescent material is contained in the interlayer film for a laminated glass in an amount of 0.01 parts by weight or more but 15 parts by weight or less relative to 100 parts by weight of the thermoplastic resin.

4. The display device capable of displaying a gradation pattern according to claim 1,
   wherein the light emitted from the light source has an intensity of 50 mW/cm² or higher.

5. The display device capable of displaying a gradation pattern according to claim 1,
   wherein the light emitted from the light source has an irradiation diameter of 0.5 cm or larger.

6. An automobile roof glass comprising the display device according to claim 1.

7. A building window glass comprising the display device according to claim 1.

* * * * *